United States Patent
Shah et al.

(10) Patent No.: US 10,045,122 B2
(45) Date of Patent: Aug. 7, 2018

(54) ACOUSTIC ECHO CANCELLATION REFERENCE SIGNAL

(71) Applicant: Knowles Electronics, LLC, Itasca, IL (US)

(72) Inventors: Pratik Shah, Itasca, IL (US); Andrew David Unruh, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 15/404,988

(22) Filed: Jan. 12, 2017

(65) Prior Publication Data
US 2017/0208391 A1    Jul. 20, 2017

Related U.S. Application Data

(60) Provisional application No. 62/278,872, filed on Jan. 14, 2016.

(51) Int. Cl.
*H04R 3/02* (2006.01)
*H04R 29/00* (2006.01)
(Continued)

(52) U.S. Cl.
CPC ............... *H04R 3/02* (2013.01); *H04R 3/005* (2013.01); *H04R 3/04* (2013.01); *H04R 29/001* (2013.01);
(Continued)

(58) Field of Classification Search
CPC .......... H04R 3/02; H04R 3/04; H04R 29/001; H04R 3/005; H04R 1/2826; H04R 1/2834; H04R 2499/11
See application file for complete search history.

(56) References Cited

U.S. PATENT DOCUMENTS

| | | | | |
|---|---|---|---|---|
| 5,313,525 A | * | 5/1994 | Klasco | H04R 1/2819 |
| | | | | 181/156 |
| 2013/0336500 A1 | * | 12/2013 | Sudo | G10K 11/002 |
| | | | | 381/94.1 |

(Continued)

FOREIGN PATENT DOCUMENTS

| CN | 1802034 B | 12/2010 |
|---|---|---|
| EP | 2 811 728 A1 | 12/2014 |
| EP | 3 099 047 A1 | 11/2016 |

OTHER PUBLICATIONS

International Search Report and Written Opinion, PCT/US2017/013259, Knowles Electronics, LLC, 10 pages (dated Mar. 24, 2017).

*Primary Examiner* — Brenda C Bernardi
(74) *Attorney, Agent, or Firm* — Foley & Lardner LLP (57) ABSTRACT

Systems and methods for acoustic echo cancellation are provided. An example method includes receiving a reference signal. The reference signal represents at least one sound captured inside an enclosure of a loudspeaker. The loudspeaker is operable to play back a far end signal. The method also includes receiving an acoustic signal. The acoustic signal represents at least one sound captured outside the enclosure of the loudspeaker. The acoustic signal includes at least a near end signal and the far end signal. The method enables attenuation, using the reference signal, the far end signal in the acoustic signal. The reference signal can be captured by a low sensitivity microphone placed inside the enclosure of the loudspeaker. The attenuation of the far end signal may include subtractive cancellation.

16 Claims, 5 Drawing Sheets

(51) Int. Cl.
*H04R 3/00* (2006.01)
*H04R 3/04* (2006.01)
*H04R 1/28* (2006.01)

(52) U.S. Cl.
CPC .......... *H04R 1/2826* (2013.01); *H04R 1/2834* (2013.01); *H04R 2499/11* (2013.01)

(56) References Cited

U.S. PATENT DOCUMENTS

| | | | |
|---|---|---|---|
| 2014/0363008 A1* | 12/2014 | Chen | G10K 11/002 381/66 |
| 2015/0117656 A1* | 4/2015 | Abe | H04B 3/232 381/66 |
| 2016/0127561 A1* | 5/2016 | Mani | H04M 9/08 379/406.08 |
| 2016/0352915 A1* | 12/2016 | Gautama | H04M 9/082 |
| 2017/0150249 A1* | 5/2017 | Proni | H04R 9/063 |

* cited by examiner

ACOUSTIC ECHO CANCELLATION REFERENCE SIGNAL

CROSS-REFERENCE TO RELATED APPLICATIONS

The present application claims priority to U.S. Prov. Appln. No. 62/278,872 filed Jan. 14, 2016, the contents of which are incorporated by reference herein in their entirety.

BACKGROUND

Acoustic echo can happen during a conversation via a communication network. The far end signal coming into a communication device can be played back by a loudspeaker of the communication device. A microphone of the communication device can capture both the near end signal and the output of the loudspeaker. The mixture of the near end signal and output of the loudspeaker can be transmitted back to the far end, so that a listener at the far end can receive a delayed version of his own speech as an "echo" sound.

Conventional AEC techniques work well for cancelling a linear echo from the uplink signal, while a nonlinear component of the echo is not suppressed. Use of a small loudspeaker is likely to result in a larger than usual nonlinear component in the acoustic echo. Improvements are needed for effective cancellation of the nonlinear component of the echo signal, while not adversely affecting the cancellation of the linear part of the echo.

SUMMARY

Systems and methods for acoustic echo cancellation (AEC) are provided. Conventional AEC techniques work well in cancelling the linear echo from the far end signal, while the nonlinear component of the echo is not suppressed. Various embodiments of the present disclosure use a microphone inside the loudspeaker cavity to capture the sound pressure level (SPL) output of the loudspeaker and use the SPL output as a reference signal for AEC.

An example method for the AEC includes receiving a reference signal. The reference signal represents at least one sound captured inside an enclosure of a loudspeaker. The loudspeaker is operable to play back a far end signal. In some embodiments, the reference signal is captured by a low sensitivity microphone placed inside the enclosure of the loudspeaker.

The example method further includes receiving an electrical acoustic signal. The electrical acoustic signal can represent at least one captured sound. In some embodiments, the sound is captured outside the enclosure of the loudspeaker. The electrical acoustic signal can include at least a far end component. The far end component represents the far end signal as played by the loudspeaker. The method enables attenuating, using the reference signal, the far end component in the electrical acoustic signal. In some embodiments, the attenuation of the far end signal involves subtractive cancellation of filtered version of the reference signal.

DETAILED DESCRIPTION OF THE PREFERRED EMBODIMENTS

The technology disclosed herein relates to systems and methods for acoustic echo cancellation.

Figure 1:
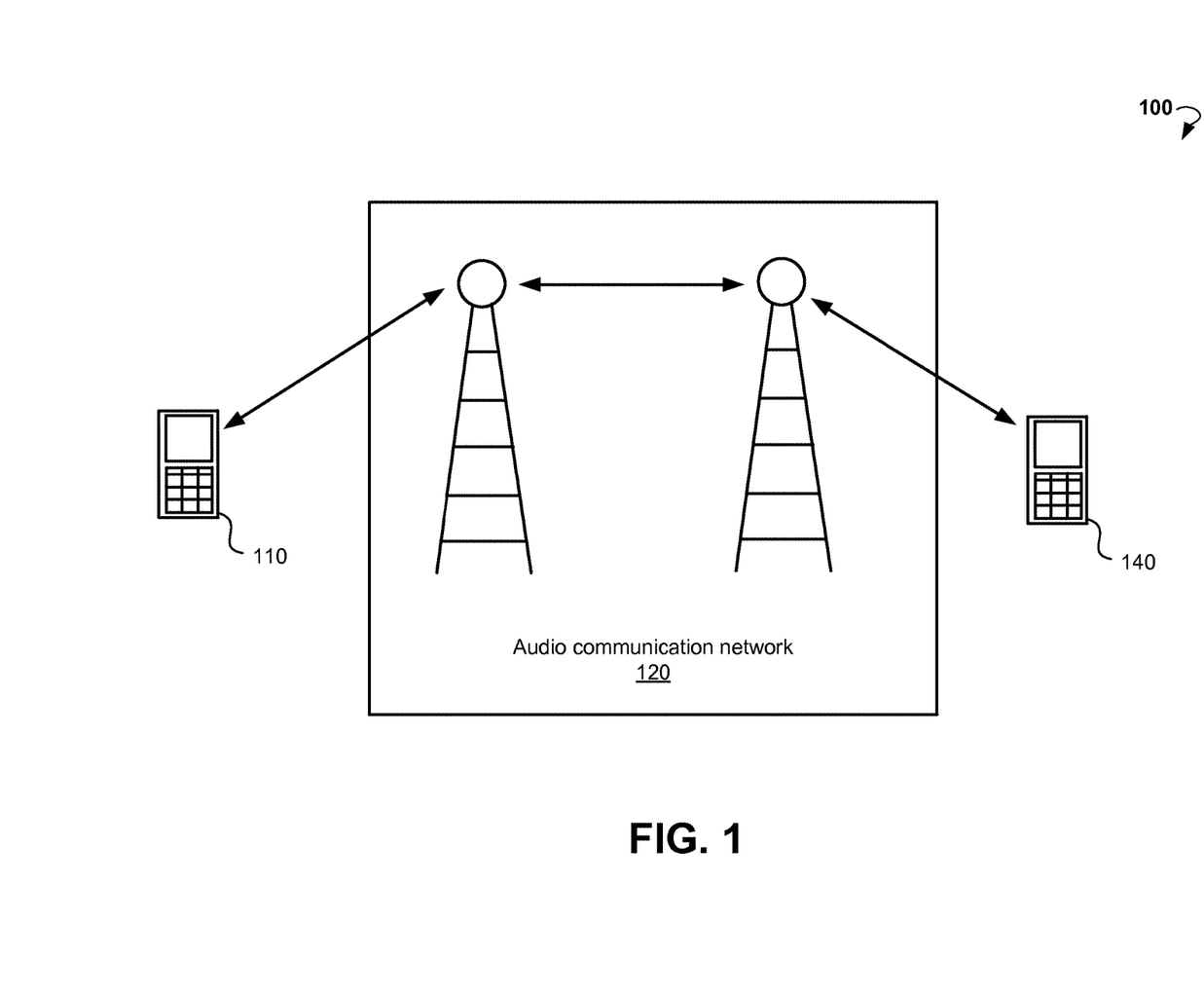
FIG. 1 is a block diagram illustrating an environment in which systems and methods for acoustic echo cancellation can be practiced, according to various example embodiments.

FIG. 1 is a block diagram showing an example system 100 for communications between audio devices. FIG. 1 includes an audio device 110, an audio device 140, and an audio communication network 120. Audio communication network 120 can communicate audio signals between audio device 110 and audio device 140, for example, during phone conversations.

Figure 2:
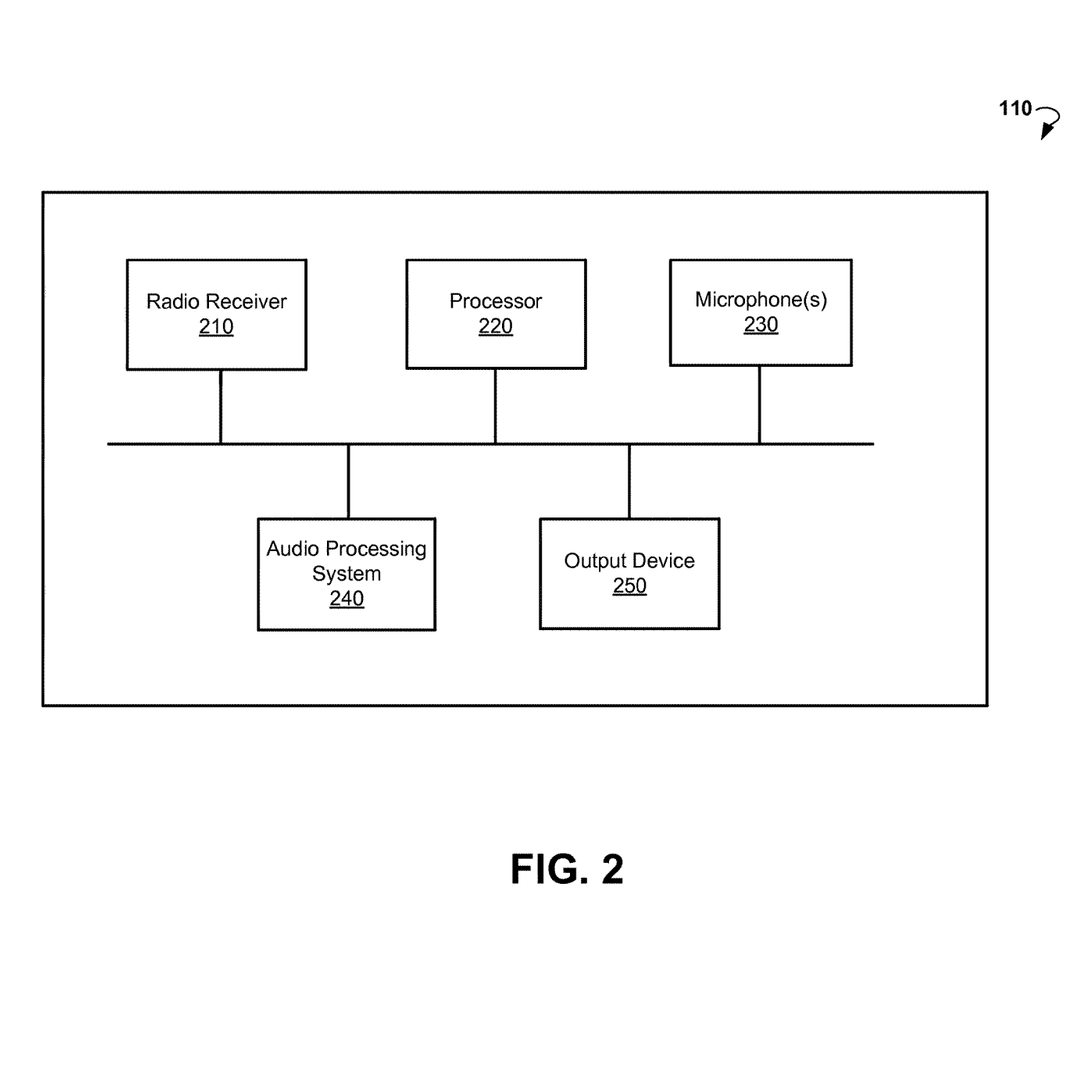
FIG. 2 is a block diagram illustrating an audio device, according to an example embodiment.

FIG. 2 is a block diagram of audio device 110 and also of audio device 140, according to an example embodiment. The audio device 110 can include a radio receiver 210, a processor 220, one or more microphone(s) 230, an audio processing system 240, and an output device 250.

A radio receiver of the audio device 110 can be configured to receive an audio signal from the audio communication network 120. The audio signal can be forwarded to the audio processing system 240 for processing of the audio signal.

In some embodiments, the audio processing system 240 includes hardware and software that can implement the methods, according to various embodiments disclosed herein. The audio processing system 240 can be further configured to receive acoustic signals from an acoustic source via microphone(s) 230 and process the acoustic signals. After receipt by the microphone(s) 230, the acoustic signals can be converted into electric signals by an analog-to-digital converter.

In some embodiments, the processor 220 of the audio device 110 can execute instructions and modules stored in a memory of the audio device to perform functionality described herein, including acoustic echo cancellation. In some embodiments, the processor includes hardware and software implemented as a processing unit, which is operable to process floating point operations and other operations for the processor.

The output device 250 includes any devices that can provide an audio output to a listener (e.g., the acoustic source). For example, the output device 250 can include a speaker, a class-D output, an earpiece of a headset, or a handset of the audio device 110.

Figure 3:
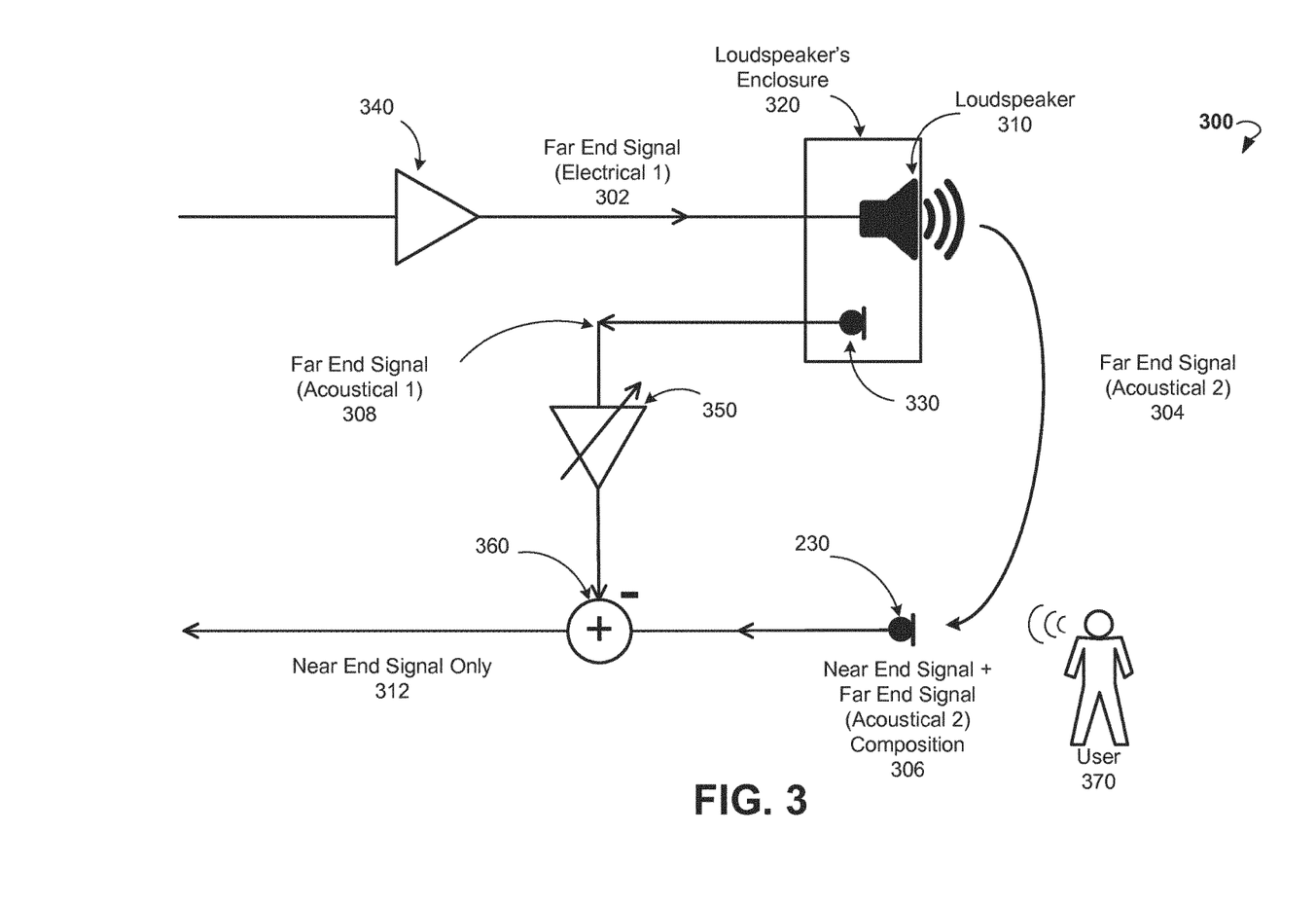
FIG. 3 shows an example system for acoustic echo cancellation, according to various example embodiments.

FIG. 3 is a block diagram showing an example system 300 in which methods for acoustic echo cancellation can be practiced, according to example embodiments. The system 300 can include a loudspeaker 310, an enclosure 320 of the loudspeaker 310, a reference microphone 330, a microphone 230, amplifiers 340 and 350, and a summing module 360. In some embodiments, the system 300 is implemented as part of an audio device 110 or 140 (shown in FIG. 1 and FIG. 2).

In various embodiments, the loudspeaker 310 is operable to receive an electrical far end signal 302 via amplifier 340 and play back corresponding audio output also referred to as acoustic far end signal 304. In certain embodiments, the electrical far end signal 302 is received during a conversion via audio communication network 120 (shown in FIG. 1) and processed via audio processing system 240 (shown in FIG. 2).

In various embodiments, the microphone 230 is operable to capture a near end signal from a sound source, for example, a user 370. After processing by the audio processing system, the near end signal can be transmitted via an audio communication network to another user at the far end site. Because the microphone 230 also captures the acoustic far end signal 304 played by the loudspeaker 310, another user at the far end site can hear not only the user 370, but also the acoustic far end signal 304. The acoustic far end signal 304 represents speech of another user at the far end, therefore, the user at the far end may hear him/herself talking with a latency due to the delay in transmission of signals over the audio communication network and/or processing of the signals. This phenomenon resembles an acoustic echo. Therefore, the acoustic far end signal 304 (the "echo") needs to be removed or attenuated in the composition 306 of the near end signal and the far end signal captured by the microphone 230.

In some conventional audio echo cancellation methods, the electrical far end signal 302 is used as a reference signal to attenuate the acoustic far end signal 304 in the composition 306 captured by microphone 230. The electrical far end signal 302 can be filtered and the filtered signal is subtracted from the composition 306. The conventional methods work well when the acoustic far end signal 304 and the electrical far end signal 302 are substantially related by a linear function. However, if a nonlinear component is present in the acoustic far end signal 304, conventional methods may not cancel all of the "echo" using the electrical far end signal 302 as the reference.

According to various example embodiments, a reference microphone 330 is placed inside the loudspeaker's enclosure 320. The reference microphone 330 can be operable to capture a reference acoustic far end signal 308. Unlike the electrical far end signal 302, the reference acoustic far end signal 308 includes nonlinear components since the reference acoustic far end signal 308 is based on output of the loudspeaker 310. In some embodiments, the reference acoustic far end signal 308 is processed with amplifier 350 and provided to the summing module 360.

In some embodiments, the summing module 360 receives the composition 306 of the near end signal and the acoustic far end signal 304 captured by microphone 230 and the reference acoustic far end signal 308. The summing module 360 can be operable, using the reference acoustic far end signal 308, to remove or attenuate the far end signal 304 from the composition 306. The summing module 360 can output a signal 312, which includes substantially captured near end signal.

In some embodiments, placing the reference microphone 330 inside the loudspeaker's enclosure 320 enables capturing nonlinear behavior of the loudspeaker 310. The reference acoustic far end signal 308 can include nonlinearities of the loudspeaker 310. From the other side, reference microphone 330 can be substantially immune to the near end signal when it is placed inside rather than outside of the loudspeaker's enclosure 320. Outside the enclosure, the sound pressure (in Pa) is proportional to the acceleration of the diaphragm of the loudspeaker 310. For example, if a loudspeaker with a radius of 0.7 cm is outputting 75 dB at one meter in half space, the sound pressure right next to the loudspeaker is about 124 dB of the sound pressure level (SPL). Inside the enclosure, where the wavelength is large compared to the dimensions of the enclosure, the pressure is proportional to the excursion of the diaphragm. The dimensions of the enclosure 320 are considerably below sound waves (SW). Therefore, the sound pressure inside the enclosure can be above 160 dB SPL. Due to the high SPL inside the enclosure, in some embodiments, a low sensitivity microphone can be used as the reference microphone 330.

The high sound pressure inside the enclosure means that any noise due to the near end signal is relatively low and can be ignored, according to various embodiments. The near end signal is further attenuated when passing through the walls of the enclosure 320. Therefore, the reference microphone 330 placed inside the enclosure 320 is much more effective than a reference microphone placed outside the enclosure 320.

Various embodiment of the present disclosure may utilize different shapes and types of enclosure 320 and the loudspeaker 310. In some embodiments, the loudspeaker 310 includes a passive radiator speaker. In certain embodiments, the loudspeaker 310 is sealed by the enclosure 320. In other embodiments, the loudspeaker 310 is not sealed. For example, the enclosure 320 may include a bass reflex system with a vent.

Because nonlinear behavior of the loudspeaker is captured by the reference microphone 330, in some embodiments, the actual echo (the acoustic far end signal 304) is related to the acoustic reference signal inside the enclosure by a linear transfer function. Therefore, even if the sound produced by the loudspeaker 310 becomes distorted, the reference acoustic far end signal 308 remains a valid representation of the distorted acoustic far end signal 304.

In some embodiments, the summing module 360 is operable to apply a subtractive cancellation (not a multiplicative masking) to remove the acoustic far end signal 304 from the composition 306 to preserve the near end signal, which is the speech of the user 370. In certain embodiments, the subtractive cancellation is implemented using a low MIPS (Million Instructions Per Second) architecture.

Figure 4:
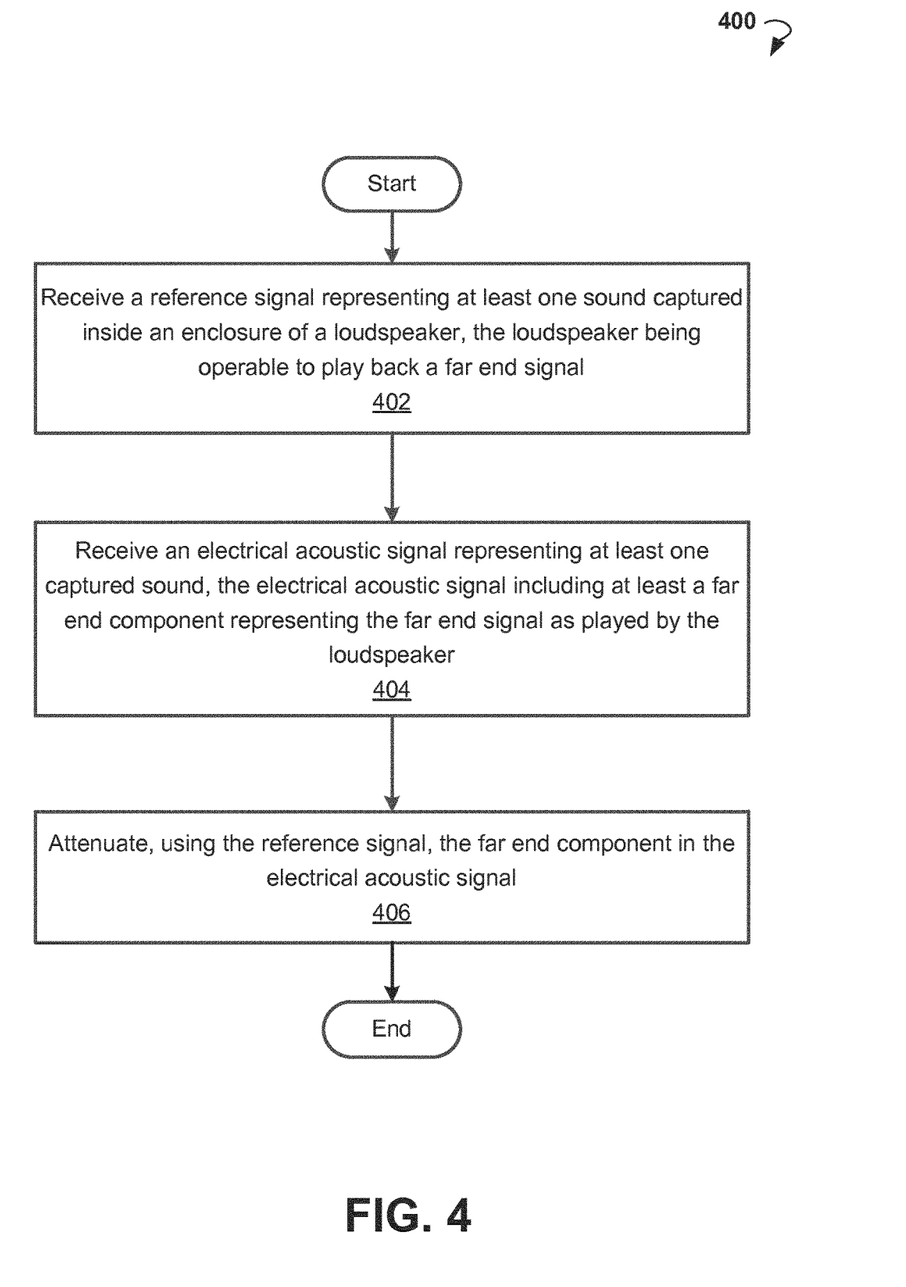
FIG. 4 is a flow chart illustrating a method for acoustic echo cancellation, according to an example embodiment.

FIG. 4 is a flow chart showing steps of a method 400 for acoustic echo cancellation, according to an example embodiment. Example method 400 can commence in block 402 with receiving a reference signal. The reference signal represents at least one sound captured inside an enclosure of a loudspeaker. The loudspeaker can be operable to play back a far end signal. In certain embodiments, the reference signal is captured by a low sensitivity microphone placed inside the enclosure of the loudspeaker.

In block 404, example method 400 can proceed with receiving an electrical acoustic signal representing at least one captured sound. The electrical acoustic signal can include at least a far end component representing the far end signal as played by the loudspeaker.

In block 406, example method 400 can attenuate, using the reference signal, the far end component in the electrical acoustic signal. In some embodiments, the attenuation of the far end signal includes subtractive cancellation of a filtered version of the reference signal.

Various embodiments of the present technology can be practiced with any audio device configured to receive and/or provide audio such as, but not limited to, cellular phones, phone handsets, headsets, and conferencing systems. It should be understood that while some embodiments of the present technology are described with reference to operations of a cellular phone or a mobile device, the present technology can be practiced with any audio device.

In various embodiments, audio devices include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. Audio devices include input devices such as buttons, switches, keys, keyboards, trackballs, sliders, touch screens, one or more microphones, gyroscopes, accelerometers, global positioning system (GPS) receivers, and the like. Audio devices can include output devices such as LED indicators, video displays, touchscreens, speakers, and the like.

In various embodiments, the audio devices operate in stationary and portable environments. Stationary environments can include residential and commercial buildings or structures, and the like. For example, the stationary embodiments can include living rooms, bedrooms, home theaters, conference rooms, auditoriums, business premises, and the like. Portable environments can include moving vehicles, moving persons, other transportation means, and the like.

Figure 5:
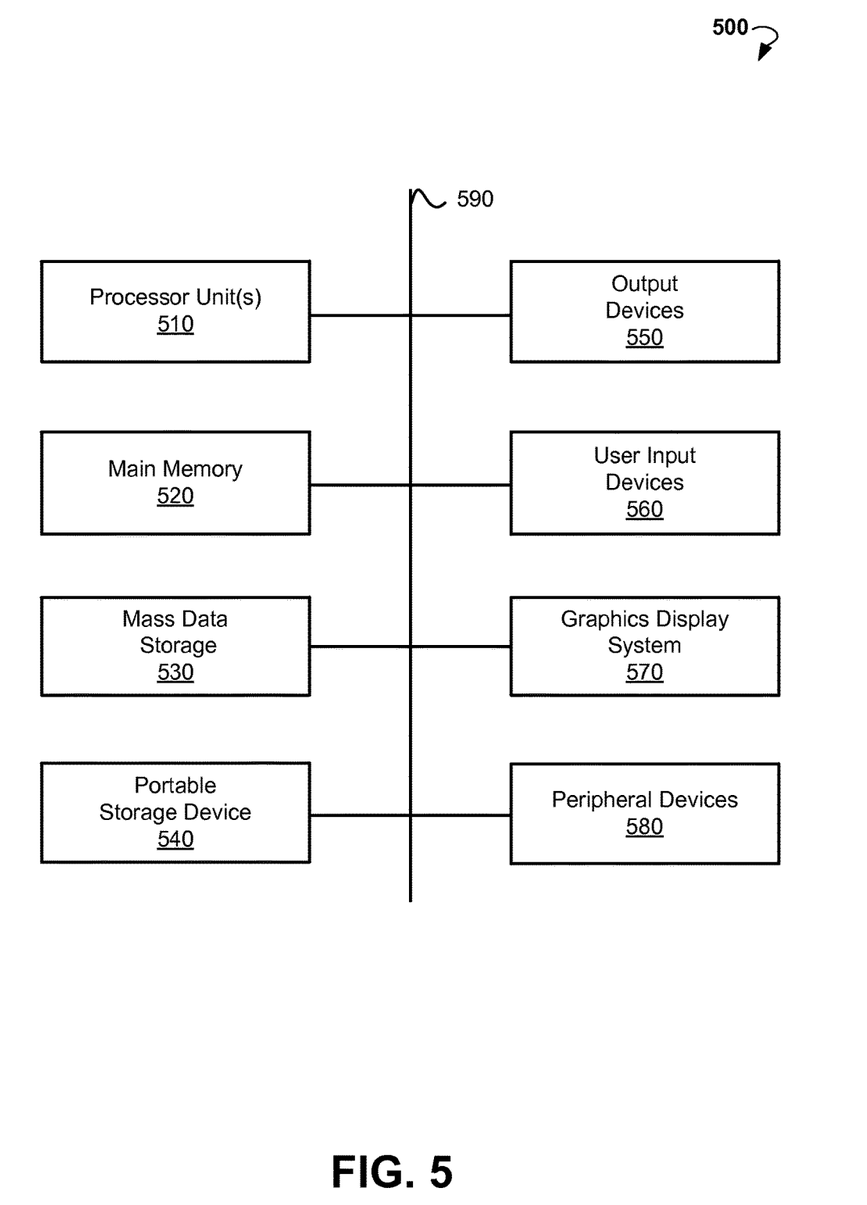
FIG. 5 illustrates an example computer system that can be used to implement embodiments of the disclosed technology.

FIG. 5 illustrates an exemplary computer system 500 that may be used to implement some embodiments of the present invention. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 is connected via a local microprocessor bus, and the mass data storage 530, peripheral device(s) 580, portable storage device 540, and graphics display system 570 are connected via one or more input/output (1/0) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for acoustic echo cancellation, the method comprising:
  receiving a reference signal representing at least sound produced by a loudspeaker, the reference signal being generated while the loudspeaker is being operated to play back a far end signal;
  receiving an electrical acoustic signal, the electrical acoustic signal including a near end component representing captured sound and a far end component representing the far end signal played by the loudspeaker; and attenuating, using the reference signal, the far end component in the electrical acoustic signal,
wherein the reference signal is produced by a microphone placed inside an enclosure of the loudspeaker,
and wherein the dimensions of the enclosure are considerably smaller than sound waves.

2. The method of claim 1, wherein the reference signal is produced by a low sensitivity microphone that is positioned to receive the sound produced by the loudspeaker.

3. The method of claim 1, wherein the attenuation of the far end component includes:
filtering the reference signal to obtain a filtered version of the reference signal; and
performing subtractive cancellation using the filtered version of the reference signal.

4. The method of claim 1, wherein the reference signal includes nonlinear effects introduced by the loudspeaker when the loudspeaker plays back the far end signal.

5. A device for acoustic echo cancellation, the device comprising:
a summing element having a first input for receiving a reference signal representing at least sound produced by a loudspeaker, the reference signal being generated while the loudspeaker is being operated to play back a far end signal, the summing element having a second input for receiving an electrical acoustic signal including a near end component representing captured sound and a far end component representing the far end signal played back by the loudspeaker,
wherein the summing element is adapted to attenuate, using the reference signal, the far end component in the electrical acoustic signal,
wherein the reference signal is produced by a microphone placed inside an enclosure of the loudspeaker,
and wherein the dimensions of the enclosure are considerably smaller than sound waves.

6. The device of claim 5, wherein the reference signal is produced by a low sensitivity microphone that is positioned to receive the sound produced by the loudspeaker.

7. The device of claim 5, wherein the attenuation of the far end component includes:
filtering the reference signal to obtain a filtered version of the reference signal; and
performing subtractive cancellation using the filtered version of the reference signal.

8. The device of claim 5, wherein the reference signal includes nonlinear effects introduced by the loudspeaker when the loudspeaker plays back the far end signal.

9. A device comprising:
a loudspeaker being operable to play back a far end signal;
a first microphone for producing a reference signal representing at least sound captured from the loudspeaker;
a second microphone for producing an electrical acoustic signal, the electrical acoustic signal representing a near end component representing captured sound, the electrical acoustic signal further including a far end component representing the far end signal played by the loudspeaker; and
an acoustic echo canceller adapted to attenuate, using the reference signal, the far end component in the electrical acoustic signal,
wherein the first microphone is placed inside an enclosure of the loudspeaker,
and wherein the dimensions of the enclosure are considerably smaller than sound waves.

10. The device of claim 9, wherein the first microphone comprises a low sensitivity microphone.

11. The device of claim 9, wherein the enclosure comprises a base reflex system with a vent.

12. The device of claim 9, wherein the loudspeaker and the first microphone are completely sealed within the enclosure.

13. The device of claim 9, wherein the loudspeaker comprises a passive radiator loudspeaker.

14. The device of claim 9, wherein the device comprises a cellular phone.

15. The device of claim 9, wherein the device comprises a phone headset.

16. The device of claim 9, wherein the device comprises a conferencing system.

* * * * *